US010537950B2

(12) United States Patent
Song et al.

(10) Patent No.: US 10,537,950 B2
(45) Date of Patent: Jan. 21, 2020

(54) COMPOUND SAW

(71) Applicant: Ningbo Defeng Power Technology Co., Ltd., Yuyao (CN)

(72) Inventors: Xiwan Song, Yuyao (CN); Yingping Shao, Yuyao (CN)

(73) Assignee: Ningbo Defeng Power Technology Co., Ltd., Yuyao (CN)

(*) Notice: Subject to any disclaimer, the term of this patent is extended or adjusted under 35 U.S.C. 154(b) by 0 days.

(21) Appl. No.: 15/745,899

(22) PCT Filed: Oct. 28, 2015

(86) PCT No.: PCT/CN2015/093073
§ 371 (c)(1),
(2) Date: Jan. 18, 2018

(87) PCT Pub. No.: WO2017/049707
PCT Pub. Date: Mar. 30, 2017

(65) Prior Publication Data
US 2018/0221972 A1 Aug. 9, 2018

(30) Foreign Application Priority Data

Sep. 21, 2015 (CN) .................... 2015 2 0733769 U

(51) Int. Cl.
*B23D 45/14* (2006.01)
*B23D 47/02* (2006.01)
*B27B 27/06* (2006.01)
(52) U.S. Cl.
CPC ............. *B23D 45/14* (2013.01); *B23D 47/02* (2013.01); *B27B 27/06* (2013.01)

(58) Field of Classification Search
CPC ...... B23D 45/14; B23D 45/044; B23D 47/02; B23D 47/12; B27B 5/165; B27B 27/06; B27G 19/04
USPC ......................................... 83/469–478, 471.3
See application file for complete search history.

(56) References Cited

U.S. PATENT DOCUMENTS

| 3,538,964 A | 11/1970 | Warrick |
| 4,532,844 A | 8/1985 | Chang et al. |
| 9,873,157 B2* | 1/2018 | Heinz ................. B23D 45/068 |
| 2006/0000331 A1 | 1/2006 | Ozawa et al. |
| 2007/0137452 A1 | 6/2007 | Oberheim |
| 2013/0019730 A1* | 1/2013 | Pierga ................. B23D 45/044 |
| | | 83/165 |
| 2016/0288226 A1 | 10/2016 | Heinz et al. |

FOREIGN PATENT DOCUMENTS

| CN | 2719488 Y | 8/2005 |
| CN | 2745685 Y | 12/2005 |
| CN | 101244468 A | 8/2008 |

(Continued)

*Primary Examiner* — Omar Flores Sanchez
(74) *Attorney, Agent, or Firm* — The Webb Law Firm

(57) ABSTRACT

A compound saw, including a frame; a motor driving assembly, which is sleeved in the frame and rotatable around a first axis perpendicular to a main plane of the frame relative to the frame; and a saw blade, which is mounted on an output shaft of the motor driving assembly and rotatable around a second axis passing through the output shaft relative to the motor driving assembly. The second axis is parallel to the first axis, and there is an eccentric distance between the second axis and the first axis.

7 Claims, 4 Drawing Sheets

(56) References Cited

FOREIGN PATENT DOCUMENTS

| | | |
|---|---|---|
| CN | 101804483 A | 8/2010 |
| CN | 201632714 U | 11/2010 |
| CN | 201632878 U | 11/2010 |
| CN | 102335784 A | 2/2012 |
| CN | 203853623 U | 10/2014 |
| CN | 105081453 B | 2/2018 |
| DE | 202015002508 U1 | 6/2015 |
| EP | 2591898 A1 | 5/2013 |

* cited by examiner

COMPOUND SAW

CROSS-REFERENCE TO RELATED APPLICATIONS

This application is the United States national phase of International Application No. PCT/CN2015/093073 filed Oct. 28, 2015, and claims priority to Chinese Patent Application No. 201520733769.4 filed Sep. 21, 2015, the disclosures of which are hereby incorporated in their entirety by reference.

FIELD OF THE INVENTION

The present invention relates a compound saw, and in particular to an elevating mechanism and a protective structure for a saw blade of a compound saw.

BACKGROUND OF THE INVENTION

A machine that is used for both a miter cut operation and a bench cut operation is known as a compound saw. Among the compound saws, there is a type of compound saw which has a frame and a deck plate fixed together, and implement a switch between a miter cut operation mode and a bench cut operation mode by a relative raising-lowering motion of a saw blade relative to the frame and the deck plate. When a part of the saw blade passes through a saw blade slot on the deck plate and so as to be higher than the upper plane of the deck plate, the bench cut operation can then be performed. Usually, when the miter cut operation is to be performed, the whole of the saw blade is hidden under the upper plane of the deck plate so that the cut operation is performed by using a lower-half portion of the saw blade.

In the related art, there are many kinds of elevating mechanisms and protective structures for saw blades. There is a representative elevating mechanism and a protective structure for saw blade disclosed in ZL201410203008.8, which use a screw pushrod mechanism, a worm and gear mechanism, a bevel gear mechanism, etc., to achieve a purpose of raising and lowering the saw blade, while equipping with related connecting rod system and shielding case to achieve a linkage protection for the saw blade.

Although these mechanisms and systems could work, their structures are complex, thus adversely affecting economy, simplicity of use and maintenance and reliability of the compound saw.

SUMMARY OF THE INVENTION

In light of the shortages described above in the related art, an object of the present invention is to provide a saw blade elevating mechanism with a simpler structure. Further, another object of the present invention is to provide a saw blade protective structure with a simpler structure and adapted to the saw blade elevating mechanism.

According to a first aspect of the present invention, there is provided a compound saw comprising a frame; a motor driving assembly sleeved (mounted) in the frame and rotatable around a first axis perpendicular to a main plane of the frame relative to the frame; and a saw blade mounted on an output shaft of the motor driving assembly and rotatable around a second axis passing through the output shaft relative to the motor driving assembly, wherein, the second axis is parallel to the first axis, and there is an eccentric distance between the second axis and the first axis.

According to a second aspect of the present invention, the compound saw according to the first aspect of the present invention further comprises: a lower shielding case hinged on the frame and is swingable within the main plane of the frame relative to the frame, wherein, the motor driving assembly is capable of driving the lower shielding case to swing when the motor driving assembly is rotated around the first axis relative to the frame.

According to a third aspect of the present invention, in the compound saw according to the first or second aspect of the present invention, the frame is provided with a cylindrical mounting hole, the motor driving assembly is provided with a cylindrical surface, the cylindrical surface of the motor driving assembly is fittingly sleeved in the cylindrical mounting hole of the frame, and the first axis is a common central axis of the mounting hole and the cylindrical surface.

According to a fourth aspect of the present invention, the compound saw according to the second aspect of the present invention further comprises: a rocker frame base, an upper end of which being hinged to one end of the frame; a frame cover fixed on the frame; a connecting rod, one end of which being hinged to the rocker frame base, an upper portion of the other end of which being provided with an engagement surface and a guide surface used to cooperate with a cylinder on the lower shielding case, and a middle portion of which being provided with an oblong slot that is sleeved on a cylinder on the frame such that the connecting rod is swingable correspondingly following the frame; a self-locking rod hinged on the frame and swingable within the main plane of the frame, one end of the self-locking rod being bent to form a hook shape portion that is capable of hooking a self-locking rod engagement surface of the lower shielding case.

According to a fifth aspect of the present invention, in the compound saw according to the fourth aspect of the present invention, in an non-operating state of the compound saw, one end of the frame is tilted upward under an action of an elastic force, and at this time, the hook shape portion of the self-locking rod is engaged with the self-locking rod engagement surface of the lower shielding case and the engagement surface of the connecting rod is engaged with the cylinder of the lower shielding case so as to lock the lower shielding case to a fixed position relative to the frame where a saw tooth portion of the saw blade exposed from the frame cover is completely covered by the lower shielding case.

According to a sixth aspect of the present invention, in the compound saw according to the fifth aspect of the present invention, the lower shielding case is unlocked by lifting the self-locking rod such that the hook shape portion of the self-locking rod is disengaged from the self-locking rod engagement surface of the lower shielding case.

According to a seventh aspect of the present invention, the compound saw according to the second aspect of the present invention further comprises: a lid fixed on the motor driving assembly and having a driving claw, wherein, the lower shielding case further has an engagement bump, and when the motor driving assembly is rotated around the first axis relative to the frame to move the blade upward, the driving claw of the lid is capable of engaging with the engagement bump of the lower shielding case so as to drive the lower shielding case to swing upward together.

According to an eighth aspect of the present invention, in the compound saw according to the seventh aspect of the present invention, the lid further has a limit claw, and when the saw blade is moved to a highest position, the limit claw of the lid is located just close to an upper edge of a middle portion of the lower shielding case, thus limiting the lower shielding case to a position where the lower shielding case is just capable of covering lower saw teeth of the saw blade.

As can be seen from the above, the compound saw according to the present invention has the following advantages:

1. Since the saw blade elevating mechanism of the compound saw is simpler, the manufacturing cost and the maintenance cost of the compound saw can be reduced, and the reliability of the compound saw can be improved.

2. Since there is provided the saw blade protective structure with a simpler structure and adapted to the saw blade elevating mechanism, it is possible to improve the safety of the compound saw in using while reducing the cost.

BRIEF DESCRIPTION OF THE DRAWINGS

The specific embodiments of the present invention will be described in the following with reference to the attached drawings. In the drawings.

DETAILED DESCRIPTION OF THE PREFERRED EMBODIMENTS

Embodiments of the present invention are shown in the attached drawings, in which the same or like references are used to denote the same or like components. In addition, directional terms such as horizontal, vertical, up, down, left, right, front and rear in the specification are relative to an operator of the compound saw.

Figure 1:
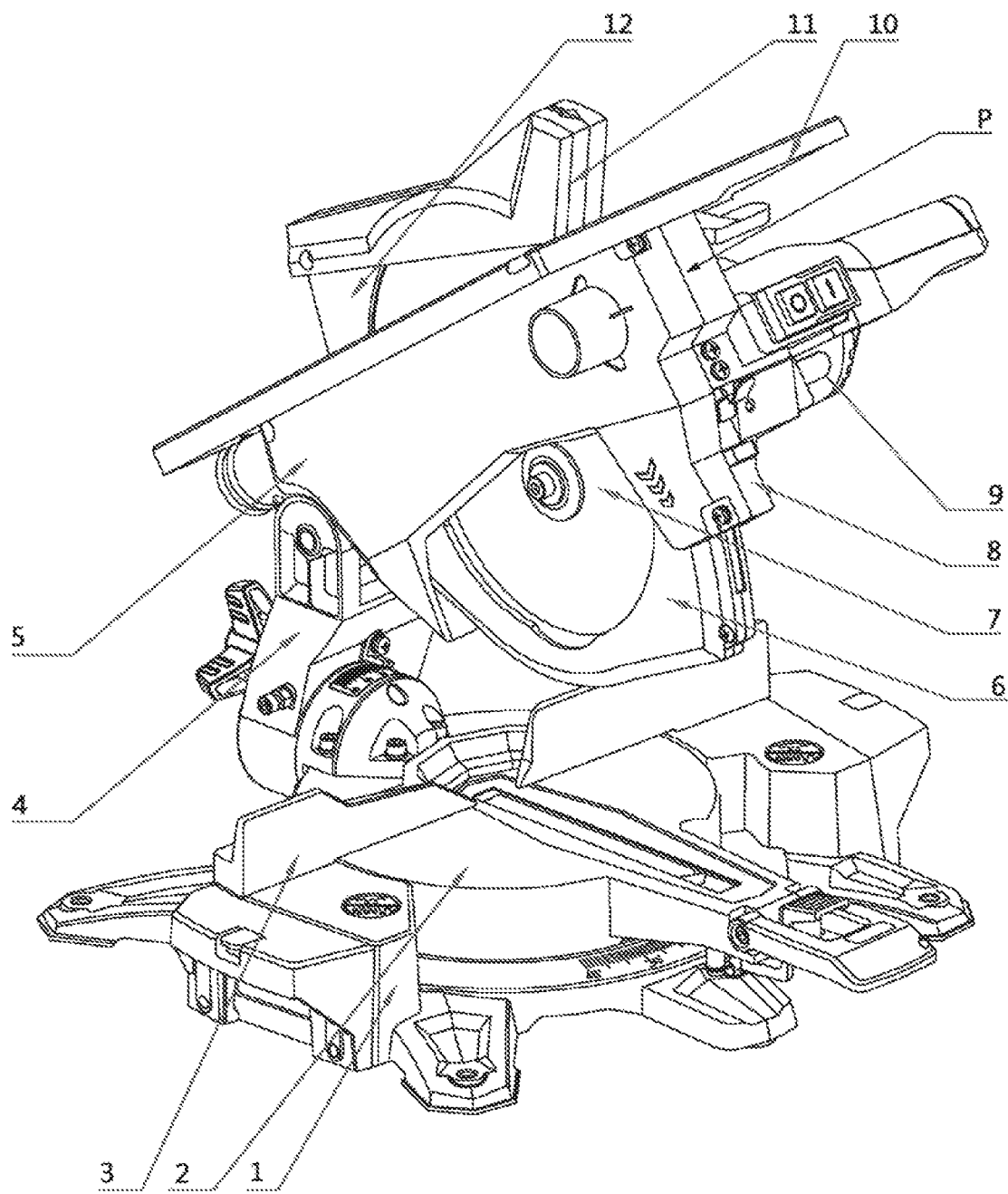
FIG. 1 is a perspective view of a compound saw according the present invention.

As shown in FIG. 1, the compound saw according to the present invention may include: a pedestal assembly 1, an operating turntable assembly 2, a positioning plate 3, a rocker frame base 4, a frame cover 5, a lower shielding case 6, a saw blade 7, a frame 8, a motor driving assembly 9, a deck plate 10, a bench cut shielding case 11 and a material separating plate 12.

The pedestal assembly 1 is a machine base of the compound saw and is used for supporting all other parts and components.

The operating turntable assembly 2 is sleeved vertically and axially on a central shaft of the pedestal assembly 1, is swingable left and right around the vertical axis, is capable of being locked in any position as required, and is used to support workpiece when the compound saw is in the miter cut operating.

The positioning plate 3 is fixedly connected to the pedestal assembly 1, and is served as a positioning and clamping reference for the workpiece when the compound saw is in the miter cut operating.

A lower end of the rocker frame base 4 is sleeved on the operating turntable assembly 2, is swingable left and right around a horizontal axis, and is capable of being locked in any position as required.

The frame 8 is a base frame for mounting parts and components such as the motor driving assembly 9, the frame cover 5, the lower shielding case 6 and an operating handle assembly. One end of the frame 8 is hinged to an upper end of the rocker frame base 4 and another end the frame 8 is capable of being tilted upward naturally under the action of a spring. By controlling and manipulating the state of the frame 8, the compound saw can perform a proper operation.

The motor driving assembly 9 is sleeved on the frame 8 to provide power and a proper saw blade operating position for the compound saw.

The saw blade 7 is fixedly mounted on an output shaft 93 of the motor driving assembly 9, is rotated with the rotation of the output shaft 93, is raised and lowered with the raising and lowering of the output shaft 93, and is used to cut the workpiece directly.

The frame cover 5 is fixedly connected to the frame 8, and not only functions as an ornament but also functions to protect the saw blade 7.

The lower shielding case 6 is hinged on the frame 8, and is swingable within a main plane P of the frame 8. When the compound saw is in the miter cut operating, the lower shielding case 6 and the frame cover 5 together perform an overall protection for the saw blade 7; when the compound saw is in the bench cut operating, the lower shielding case 6 and the frame cover 5 together protect (cover) the lower portion of the saw blade 7.

The deck plate 10 is fixedly mounted on the upper portion of the frame 8, and provides a supporting and a positioning reference when the compound saw is in the bench cut operating.

The material separating plate 12 is fixedly mounted on the frame 8 and is positioned in the same plane as the saw blade 7, completely separates the workpieces that have been cut apart, and protects a portion of the saw blade 7 which is located above the deck plate 10 when the compound saw is the bench cut operating.

The bench cut shielding case 11 is hinged on the material separating plate 12, and protects a portion of the saw blade 7 which is located above the deck plate 10 when the compound saw is in the bench cut operating.

Figure 2:
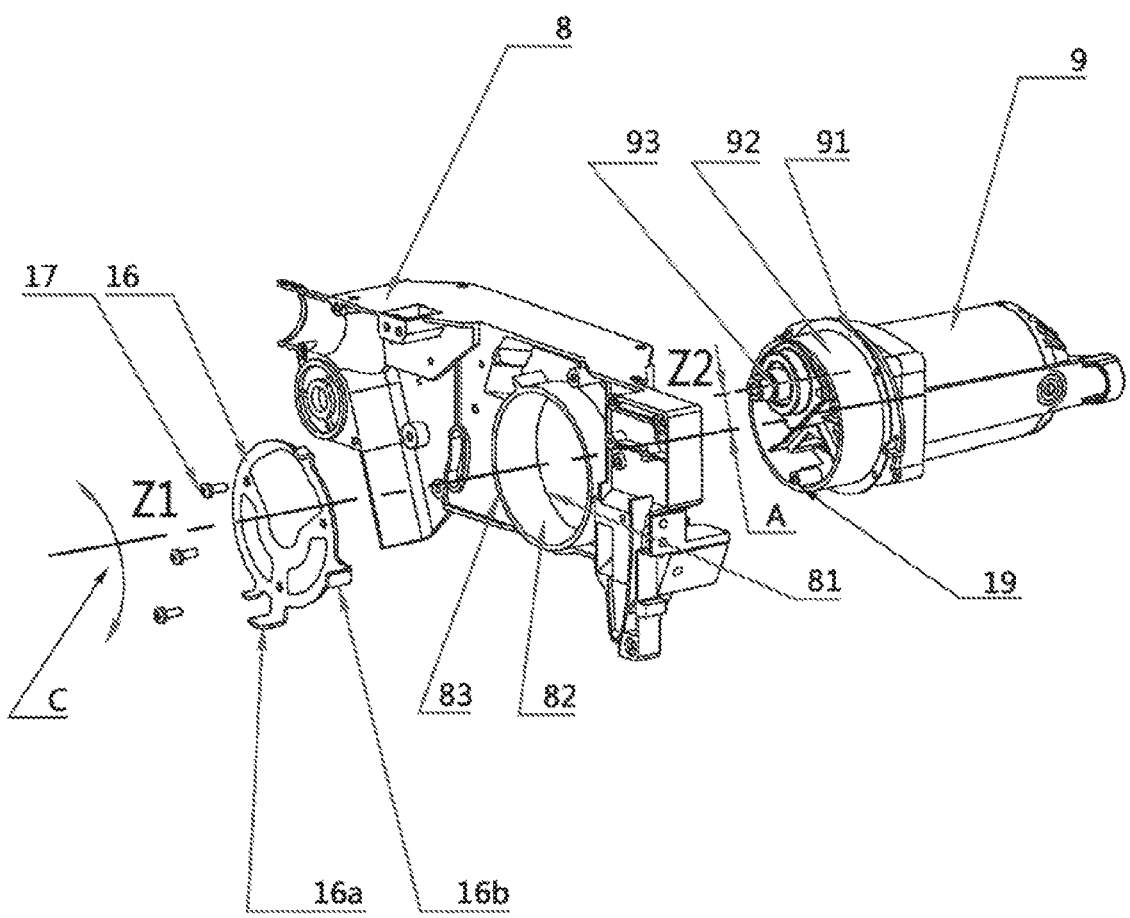
FIG. 2 is a perspective view of an embodiment of a saw blade elevating mechanism of the compound saw according the present invention.

FIG. 2 is a perspective view of an embodiment of a saw blade elevating mechanism of the compound saw according the present invention.

The saw blade elevating mechanism mainly includes the frame 8 and the motor driving assembly 9. A cylindrical mounting hole 82 is provided in the frame 8, and a cylindrical surface 92 is provided on the motor driving assembly 9. As illustrated by arrow C in the figure, when the cylindrical surface 92 is concentrically fitted and sleeved in the mounting hole 82, the cylindrical surface 92 is rotatable in the mounting hole 82 around a common first axis Z1 of the cylindrical surface 92 and the mounting hole 82, and the first axis Z1 is perpendicular to the main plane P of the frame 8.

Obviously, in light of the above teachings, persons skilled in the art can conceive of various structures mounting the motor driving assembly 9 on the frame 8 and allowing the motor driving assembly 9 to rotate relative the frame 8. Each of these structures is within the scope of the present invention.

The saw blade 7 mounted on the output shaft 93 of the motor driving assembly 9 is rotatable around a second axis Z2 passing through the output shaft 93 relative to the motor driving assembly 9. The second axis Z2 is parallel to the first axis Z1, and there is an eccentric distance A between the second axis Z2 and the first axis Z1.

Because of the eccentric distance A between the second axis Z2 and the first axis Z1, the output shaft 93 of the motor driving assembly 9 can be raised and lowered by rotating the motor driving assembly 9 relative to the frame 8, and thus raising and lowering the saw blade 7 mounted on the output shaft 93.

In the practical use, the compound saw is switched to the bench cut operation mode by raising the saw blade 7 to an upper position, and the compound saw is switched to the miter cut operation mode by lowering the saw blade 7 to a lower position. It is noted that said upper position may be the highest position the saw blade 7 could reach (i.e., the position when the second axis Z2 locates just above the first axis Z1) and also may be a position lower than the highest position; the lower position may be the lowest position the saw blade 7 could reach (i.e., the position when the second axis Z2 locates just below the first axis Z1) and also may be a position higher than the lowest position. Obviously, a height difference between the highest position and the lowest position of the saw blade 7 is 2 A.

To prevent an axial float (axial movement) of the motor driving assembly 9 in the first axis Z1 direction relative to the frame 8, a preferable but non-limiting scheme as follows can be adopted: positioning planes 81 and 83 are provided at both sides of the mounting hole 82 of the frame 8 respectively, and a position restricting plane 91 is provided on the motor driving assembly 9. When the cylindrical surface 92 of the motor driving assembly 9 is concentrically fitted and sleeved in the mounting hole 82 of the frame 8, the position restricting plane 91 of the motor driving assembly 9 abuts against the positioning plane 81 of the frame 8. Further, a lid 16 is provided which is mounted on a side of the motor driving assembly 9 towards the frame 8 by one or more screws 17. The lid 16 is abutted against the positioning plane 83 of the frame 8 by tightening the screws 17 into screw holes 19 on the motor driving assembly 9. In other words, the lid 16 and the position restricting plane 91 of the motor driving assembly 9 clamp the frame 8 from both sides of the frame 8, thus preventing axial float of the motor driving assembly 9 relative to the frame 8.

Obviously, in light of the above teachings, persons skilled in the art can conceive of various structures which are capable of limiting/preventing axial movement of the motor driving assembly 9 relative to the frame 8. Each of these structures is within the scope of the present invention.

Figure 3:
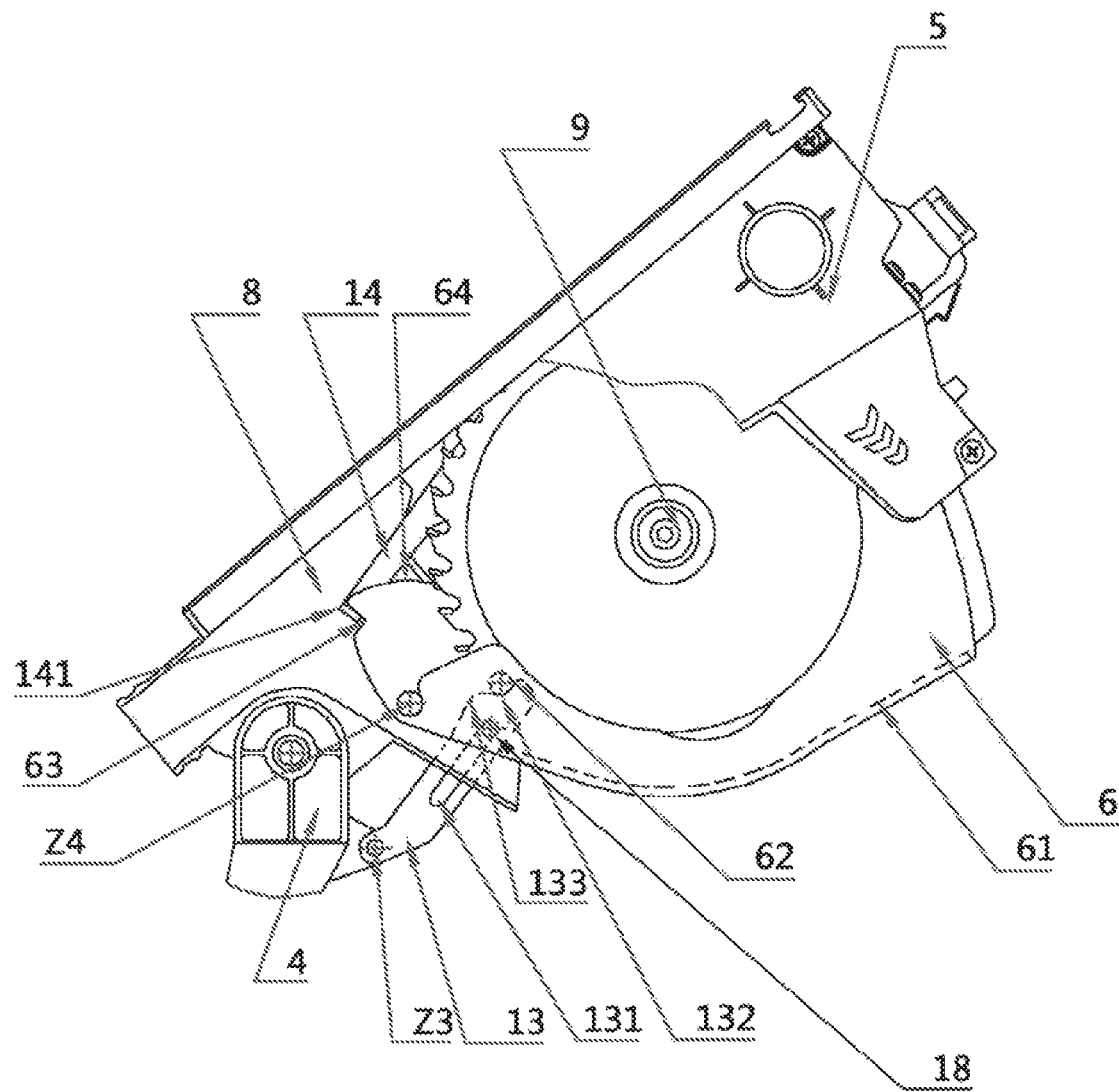
FIG. 3 is a perspective view of an embodiment of a protective structure of the compound saw according the present invention which protects the saw blade as the compound saw is in a miter cut operation mode.

FIG. 3 is a perspective view of an embodiment of a protective structure of the compound saw according the present invention which protects the saw blade 7 as the compound saw is in the miter cut operation mode. In the miter cut operation mode, when in a non-operating state, a right side of the frame is tilted upward under the action of a spring. At the same time, the protection for the saw blade 7 is realized by the following components: the rocker frame base 4, the frame cover 5, the lower shielding case 6, the frame 8, the motor driving assembly 9, the connecting rod 13 and the self-locking rod 14.

The middle of the lower portion of the lower shielding case 6 is provided with a slot 61 allowing the saw blade 7 to pass therethrough. A cylinder 62 is provided or mounted to the upper left of the slot 61. A self-locking rod engagement surface 63 is provided to the most-left end of the lower shielding case 6 (i.e., the end close to the rocker frame base 4). A self-locking rod guide surface 64 is provided to the upper right of the self-locking rod engagement surface 63. The lower shielding case 6 is hinged to the frame 8 at an axis Z4. The lower shielding case 6 is swingable around the axis Z4 within a certain range.

One end of the connecting rod 13 is hinged to the rocker frame base 4 at an axis Z3, and an upper portion of another end of the connecting rod 13 is provided with an engagement surface 132 and a guide surface 133 cooperating with the cylinder 62 on the lower shielding case 6. A middle portion of the connecting rod 13 is provided with an oblong slot 131 which is sleeved on a cylinder 18 on the frame 8 such that the connecting rod 13 is capable of swinging correspondingly following the frame 8.

The self-locking rod 14 is hinged on the frame 8, and is swingable within the main plane P of the frame 8. An end of the self-locking rod 14 is bent to form a hook shape portion 141 that is capable of hooking the self-locking rod engagement surface 63 of the lower shielding case 6. Another end of the self-locking rod 14 is extended to an operating handle (not shown) for operation convenience.

In the miter cut operation mode, when in the non-operating state, the right side of the frame is tilted upward under the action of a spring. At this time, the hook shape portion 141 of the self-locking rod 14 is engaged with the self-locking rod engagement surface 63 of the lower shielding case 6 and the engagement surface 132 of the connecting rod 13 is engaged with the cylinder 62 of the lower shielding case 6, thus locking the lower shielding case 6 to a fixed position relative to the frame 8 where a saw tooth portion of the saw blade 7 exposed from the frame cover 5 is completely protected/covered by the lower shielding case 6.

If the miter cut operation is to be carried, it is only necessary to lift up the hook shape portion 141 of the self-locking rod 14 away from the self-locking rod engagement surface 63 of the lower shielding case 6, unlocking the lower shielding case 6 from the hook shape portion 141, the frame can be pressed downward to perform the sawing operating. At this time, the connecting rod guide surface 133 can delay a clockwise rotation of the lower shielding case 6 due to the gravity thereof such that the hook shape portion 141 on the self-locking rod 14 is engaged with the guide surface 64 on the lower shielding case 6 smoothly, thus the pressing of the entire frame 8 can be preformed continuously, and thus a movement trajectory can be ensured in the case where the hook shape portion 141 is re-engaged with the self-locking rod engagement surface 63 automatically when the frame 8 is tilted upward again latter.

The lower shielding case 6 of the compound saw may adopt a follow-up type shielding case. When the frame 8 is pressed down to a certain extent, the lower shielding case 6 will touch the workpiece. At this time, if the frame 8 continues to be pressed down, the lower shielding case 6 will be jacked up by the workpiece naturally, and at the same time the saw blade 7 will protrude from the slot 61 of the lower shielding case 6 and cut into the workpiece.

Figure 4:
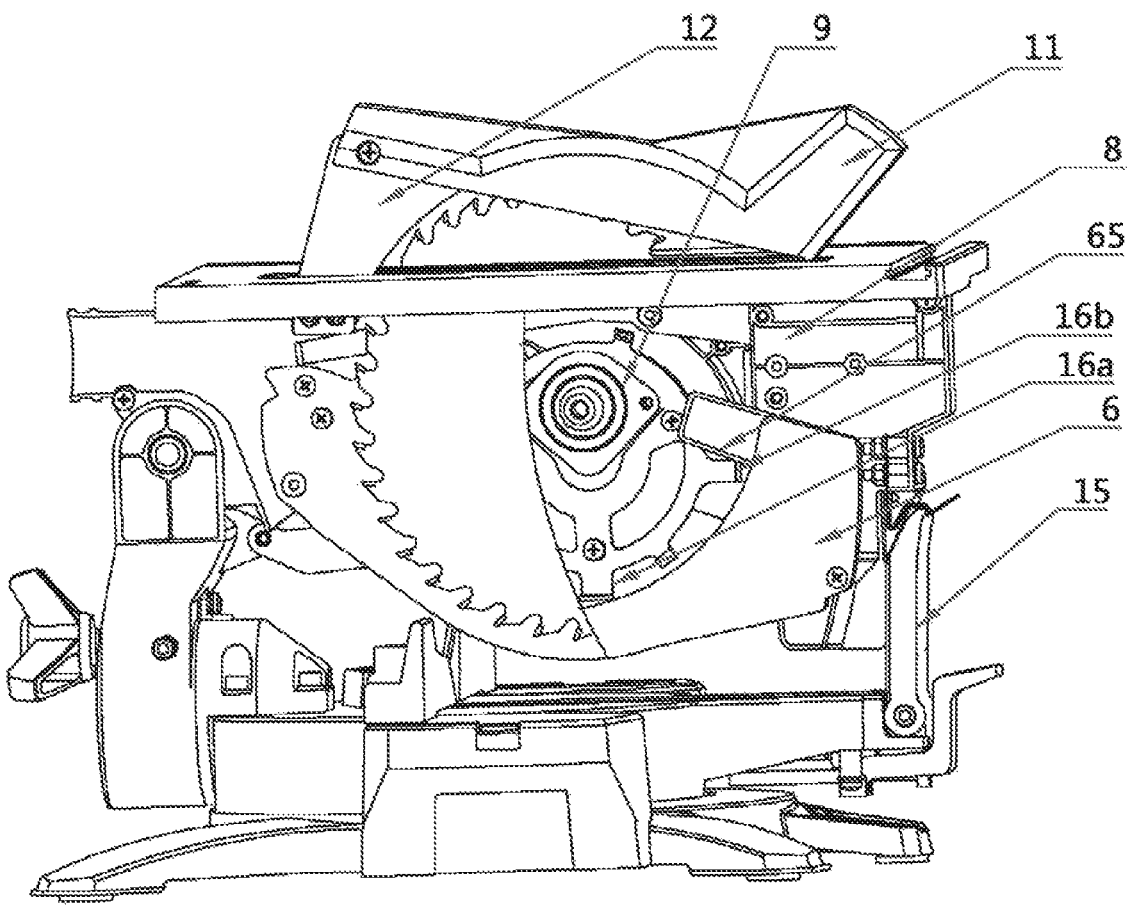
FIG. 4 is a perspective view of an embodiment of a protective structure of the compound saw according the present invention which protects the saw blade as the compound saw is in a bench cut operation mode.

FIG. 4 is a perspective view of an embodiment of a protective structure of the compound saw according the present invention which protects the saw blade as the compound saw is in a bench cut operation mode. The protection of the saw blade 7 is realized by the following components: the frame cover 5 (not shown), the lower shielding case 6, the frame 8, the motor driving assembly 9, the bench cut shielding case 11, the material separating plate 12 and a heading locking pinch plate 15.

To switch the compound saw to the bench cut operation mode for bench cut operating, the frame 8 and the deck plate 10 are first locked in a horizontal position, and the locking operation is accomplished by a head locking pinch plate 15. The protection for the saw blade 7 in the bench cut operation mode means the protection for the saw blade 7 when the deck plate 10 of the compound saw is fixed in the horizontal position. The protection for a portion of the saw blade 7 which is located above an upper plane of the deck plate 10 is accomplished by the shielding case 11 and the material separating plate 12; the protection for a middle portion of the saw blade 7 is accomplished by the frame cover 5; and the protection for a lower end portion of the saw blade 7 is accomplished by the lower shielding case 6.

In order for the lower shielding case 6 to effectively protect the lower end portion of the blade 7, it is advantageous that the lower shielding case 6 can swing upward following the movement of the saw blade 7 when the motor driving assembly 9 is rotated around the first axis Z1 relative to the frame 8 to move the blade 7 upward so that the compound saw is switched from the miter cut operation mode to the bench cut operation mode. This purpose can be achieved by the scheme as follows: the motor driving assembly 9 is capable of driving the lower shielding case 6 to swing upward when the motor driving assembly 9 is rotated relative to the frame 8. For example, a driving portion can be provided on the motor driving assembly 9, and an engagement portion can be provided on the lower shielding case 6. The driving portion on the motor driving assembly 9 can be engaged with the engagement portion on the lower shielding case 6 so as to drive the lower shielding case 6 to swing. As one example, a driving claw 16b is provided on the lid 16 as shown in FIG. 2, and an engagement bump 65 is provided at an upper portion of the right end of the lower shielding case 6 as shown in FIG. 4. When the motor driving assembly 9 is rotated around the first axis Z1 relative to the frame 8 to move the blade 7 upward, the driving claw 16b of the lid 16 can be engaged with the engagement bump 65 of the lower shielding case 6 to drive the lower shielding case 6 to swing upward together. In light of the above teachings, various mechanisms capable of utilizing the motor driving assembly 9 to drive the lower shielding case 6 are apparent to those skilled in the art, and each of these mechanisms is within the scope of the present invention.

Advantageously, the lid 16 is also provided with a limit claw 16a thereon such that the limit claw 16a is located just close to an upper edge of the middle portion of the lower shielding case 6, thus limiting the lower shielding case 6 in a position where the lower shielding case 6 is just capable of protecting/covering the lower saw teeth of the saw blade 7.

Some exemplary embodiments of the present invention have been provided above for purposes of explanation and illustration. However, the foregoing explanation and illustration are not intended to be exhaustive or to limit the invention to the particular forms disclosed. It will be apparent to those skilled in the art that various modifications and variations can be made. In the spirit and scope of the present invention, the various features may be combined, replaced and omitted, and various embodiments and technical solutions may be combined arbitrarily. Accordingly, the scope of the present invention is defined only by the appended claims and their equivalents.

What is claimed is:

1. A compound saw, comprising:
   a frame;
   a motor driving assembly sleeved in the frame and rotatable around a first axis perpendicular to a main plane of the frame relative to the frame;
   a saw blade mounted on an output shaft of the motor driving assembly and rotatable around a second axis passing through the output shaft relative to the motor driving assembly, and
   a lower shielding case hinged on the frame and swingable within the main plane of the frame relative to the frame,
   wherein the second axis is parallel to the first axis, and there is an eccentric distance between the second axis and the first axis,
   wherein the frame is provided with a cylindrical mounting hole, the motor driving assembly is provided with a cylindrical surface, the cylindrical surface of the motor driving assembly is fittingly sleeved in the cylindrical mounting hole of the frame, and the first axis is a common central axis of the mounting hole and the cylindrical surface, and
   wherein the motor driving assembly is capable of driving the lower shielding case to swing when the motor driving assembly is rotated around the first axis relative to the frame.

2. The compound saw according to claim 1, further comprising:
   a rocker frame base, an upper end of which being hinged to one end of the frame;
   a frame cover fixed on the frame;
   a connecting rod, one end of the connecting rod being hinged to the rocker frame base, an upper portion of the other end of the connecting rod being provided with an engagement surface and a guide surface used to cooperate with a cylinder on the lower shielding case, and a middle portion of the connecting rod being provided with an oblong slot that is sleeved on a cylinder on the frame such that the connecting rod is capable of swinging correspondingly following the frame;
   a self-locking rod hinged on the frame and swingable within the main plane of the frame, one end of the self-locking rod being bent to form a hook shape portion that is capable of hooking a self-locking rod engagement surface of the lower shielding case.

3. The compound saw according to claim 2, wherein, in an non-operating state of the compound saw, one end of the frame is tilted upward under an action of an elastic force, and at this time, the hook shape portion of the self-locking rod is engaged with the self-locking rod engagement surface of the lower shielding case and the engagement surface of the connecting rod is engaged with the cylinder of the lower shielding case so as to lock the lower shielding case to a fixed position relative to the frame where a saw tooth portion of the saw blade exposed from the frame cover is completely covered by the lower shielding case.

4. The compound saw according to claim 3, wherein, the lower shielding case is unlocked by lifting the self-locking rod such that the hook shape portion of the self-locking rod is disengaged from the self-locking rod engagement surface of the lower shielding case.

5. The compound saw according to claim 1, further comprising:
   a lid fixed on the motor driving assembly and having a driving claw,
   wherein, the lower shielding case further has an engagement bump,
   when the motor driving assembly is rotated around the first axis relative to the frame to move the blade upward, the driving claw of the lid is capable of engaging with the engagement bump of the lower shielding case so as to drive the lower shielding case to swing upward together.

6. The compound saw according to claim 5, wherein, the lid further has a limit claw, when the saw blade is moved to a highest position, the limit claw of the lid is located just close to an upper edge of a middle portion of the lower shielding case, thus limiting the lower shielding case to a position where the lower shielding case is just capable of covering lower saw teeth of the saw blade.

7. The compound saw according to claim 1, wherein, the frame is provided with a cylindrical mounting hole, the motor driving assembly is provided with a cylindrical surface, the cylindrical surface of the motor driving assembly is fittingly sleeved in the cylindrical mounting hole of the frame, and the first axis is a common central axis of the mounting hole and the cylindrical surface.

* * * * *